UNITED STATES PATENT OFFICE.

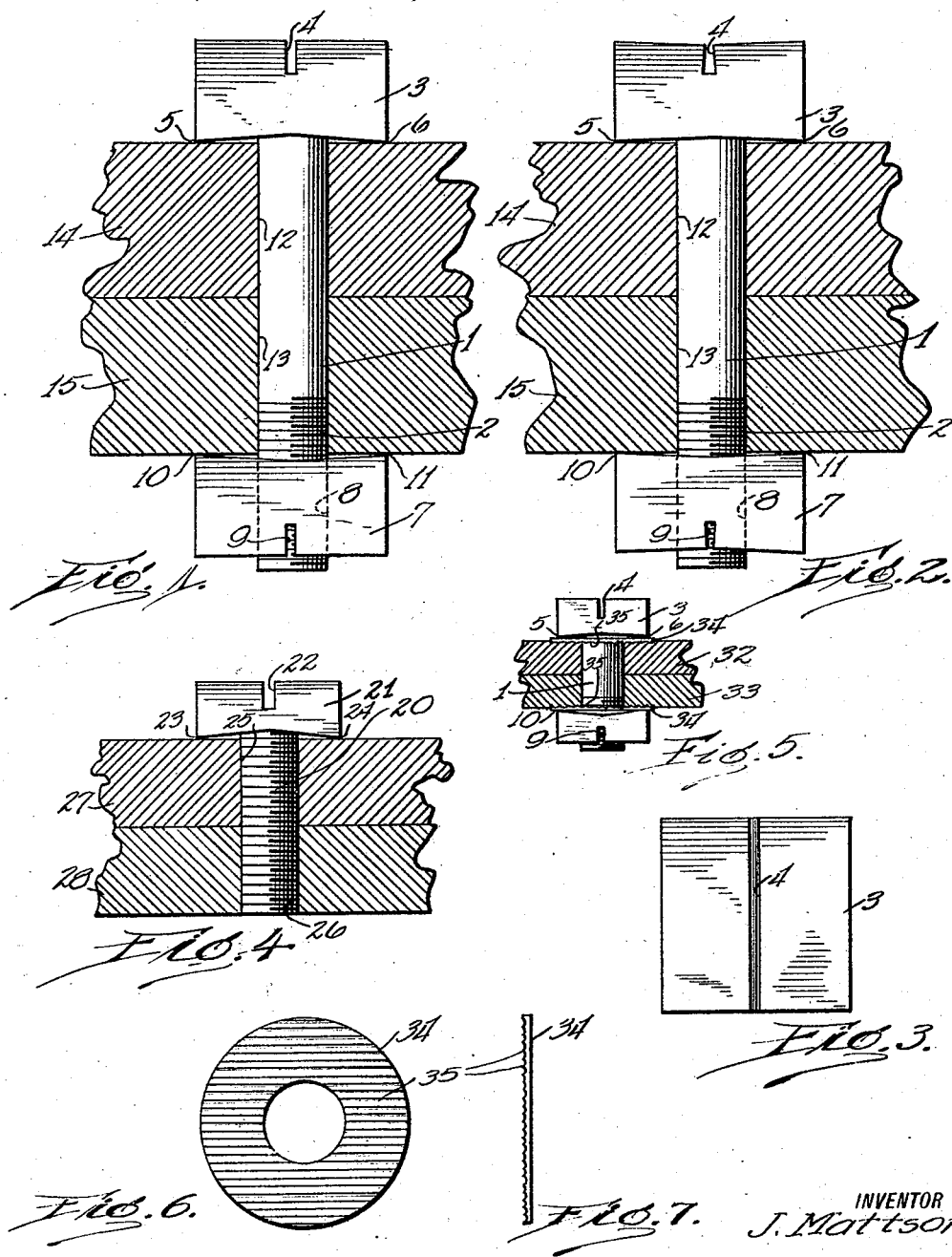

JULIUS MATTSON, OF CHICAGO, ILLINOIS.

CLAMPING DEVICE.

1,420,725. Specification of Letters Patent. Patented June 27, 1922.

Application filed March 16, 1921. Serial No. 452,725.

*To all whom it may concern:*

Be it known that I, JULIUS MATTSON, a citizen of the United States, and a resident of the city of Chicago, in the county of Cook and State of Illinois, have invented a new and useful Improvement in Clamping Devices, of which the following is a full, clear, and exact description.

My invention relates to improvements in clamping devices and it consists in the combinations, constructions, and arrangements herein described and claimed.

An object of my invention is to provide a device of the character described that embodies a bolt and nut mechanism of novel construction.

A further object of my invention is to provide a clamping device embodying relatively movable means adapted to engage with opposite surfaces of the work engaged so as to be locked in adjusted positions relative to one another and to the work.

A further object of my invention is to provide a device of the character described in which a bolt having a shank adapted to be projected through registering openings in lapped members has a head formed to engage with an underlying surface so as to lock the bolt in adjusted position relative to the lapped members when a nut is screwed on the shank of the bolt to clamp the lapped members together.

A further object of my invention is to provide a device of the character described in which the head of a bolt embodied therein and the nut adapted to screw on the threaded shank of the bolt are formed similarly so that the head of the bolt is adapted to engage with the contiguous surface of one of two lapped members through which the shank of the bolt is projected and the nut screwed on the shank is adapted to engage with the contiguous surface of the other of the lapped members to firmly clamp the lapped members to one another, to lock the head of the bolt in adjusted position relative to the lapped members, and to lock the nut in adjusted position relative to the lapped members and on the shank of the bolt.

A further object of my invention is to provide a device of the character described that is simple in construction, inexpensive to manufacture, and thoroughly practical commercially.

Other objects and advantages will appear in the following specification, and the novel features of the invention will be particularly pointed out in the appended claims.

My invention is illustrated in the accompanying drawings, forming part of this application, in which, Figure 1 is a section through lapped members, showing the relative positions of the bolt and nut clamping the members to one another before the nut has been fully tightened, Figure 2 is a view similar to Fig. 1, showing the parts of the device in operative positions, Figure 3 is a plan view of the bolt embodied in the device, Figure 4 is a view similar to Fig. 2, showing the bolt used alone to secure lapped members together, Figure 5 is a view showing the use and application of a modified form of the device, a washer being embodied therein, Figure 6 is a bottom plan view of the washer embodied in the modified form of the device, and Figure 7 is an edge view of the washer.

In carrying out my invention in its preferred form, I provide a bolt comprising a shank 1 threaded adjacent one end thereof, as at 2, and formed integrally at its other end with a head 3. The bolt may be formed of any suitable material having the resiliency of the steel usually used in the manufacture of bolts and the head thereof, which in the present instance is shown as being square, may be round, hexagonal, or of any other desired form. The head 3 is fashioned with a slot 4 in its upper surface extending entirely thereacross and intersecting the axis of the shank 1. The under surface of the head 3 is formed to taper uniformly in opposite directions from its median line parallel with the slot 4 so that relatively sharp edges 5 and 6 are provided.

A nut 7 having a threaded bore 8 adapted to engage with the threaded portion 2 of the shank 1 is in essential respects exactly identical with the head 3. A slot 9 in the upper surface of the nut corresponds to the slot 4 while the under surface of the nut is tapered oppositely from its median line parallel with the slot 9 to provide the sharp edges 10 and 11.

From the foregoing description of the various parts of the device, the operation thereof may be readily understood. The shank 1 may be projected through registering openings 12 and 13, respectively, in lapped members 14 and 15 so that the under surface of the head 3 contacts with the contiguous surface of the adjacent member. The nut 7 is then screwed on the threaded portion 2. Obviously, as force is applied to tighten the nut, the edges 5 and 6 of the head will grip the surface engaged to prevent the turning of the head relative to the member 14. Consequently, the turning of the nut will clamp the members 14 and 15 together more tightly. In the usual bolt and nut construction, the head frequently turns as the nut is screwed on the shank, thereby rendering the turning of the nut ineffective. As the nut is screwed on the shank more tightly against the contiguous surface of the member 15, the edges 10 and 11 will engage with the surface contacted. Continued tightening of the nut 7 tends to move the opposite side portions of the head 3 and of the nut 7 about their respective median lines so that the upper edges of the slot 4 are moved slightly toward each other as shown in Figure 2 and the corresponding edges of the slot 9 are likewise moved slightly toward one another, as shown in the same figure. Obviously, this movement will be resisted on account of the resiliency of the material composing the head and the nut and consequently the head 3 and the nut 7 will be locked in adjusted positions relative to the members 14 and 15 as the edges 5 and 6 and 10 and 11 will be constantly maintained in operative engagement with the contiguous surfaces. In addition, the nut 7 will be locked in adjusted position relative to the threaded portion of the shank 1 as the thrust against the edges 10 and 11 causes the opposite walls of the slotted portion of the bore 8 to be moved toward one another and thus forced tightly against the threaded shank.

It will be observed that the nut 7 and the head 3 are adapted to be engaged by either a wrench or a screw driver.

Referring now to Figure 4, I show a modified form of the device in which a bolt of the cap screw type is provided. The bolt in this modified form of the invention comprises a shank 20 that is threaded for its entire length and a head 21 that is identical in essential respects with the head 3 of the preferred form of the device, being provided with a slot 22 in its upper surface and having its under surface formed to provide opposite sharp edges 23 and 24. It will be noted that no nut is used in this embodiment of the invention as the threaded shank 20 engages the registering threaded openings 25 and 26, respectively, in the members 27 and 28.

In Fig. 5, I show the shank 1 projected through registering openings 30 and 31, respectively, in lapped members 32 and 33, made of wood or other relatively soft material. In this embodiment, a washer 34 is mounted on the shank 1 between the under surface of the head 3 and the contiguous surface of the member 32 and a second washer which is identical with the washer 34 and has therefore been denoted by the same reference numeral is mounted on the shank 1 between the nut 7 and the contiguous surface of the member 33. One surface of the washer 34 is corrugated as at 35 and this corrugated surface contacts with the contiguous surface of the member engaged, thereby preventing movement of the washer relative to the surface of the member engaged. The washer embodied in this modification of the invention is clearly shown in Figures 6 and 7. The sharp edges 5 and 6 of the head and 10 and 11 of the nut engage the upper surfaces of the underlying washers so the operation of the modified form of the device illustrated in Fig. 5 is in essential respects identical with the operation of the preferred form of the device. If the sharp edges 5 and 6 of the head and 10 and 11 of the nut were moved into contact with the surfaces of the relatively soft material, such as that forming the members 32 and 33, it is possible that annular grooves would be cut in the surfaces contacted, thereby detrimentally affecting the operation of the device. The washers 34 are therefore interposed in the manner described and illustrated.

It will be understood that many forms and modifications of the device other than those illustrated may be provided without departing from the spirit and scope of my invention as set forth in the foregoing disclosure and outlined more particularly in the appended claims, and I therefore consider such modifications and adaptations as my own.

I claim:

1. In a device of the character described, a bolt formed with a head having a slot in its upper surface and having its under surface formed to contact with a contiguous surface along the opposite edges thereof parallel with the slot, whereby the head is maintained in adjusted position when clamped to the underlying surface.

2. The combination with lapped members having registering openings therethrough of a bolt having integral head and shank portions, said shank being threaded adjacent its end and being projected through said threaded openings and said head being formed with a diametrically disposed slot in its upper surface and with its under surface tapering uniformly in opposite directions from its median line parallel with the slot to the edges thereof, and means engaging with the threaded portion of the shank and with the adjacent surface of one of the lapped members for clamping the head to the opposite surface of the other of the lapped members, whereby the lapped members are clamped together and the head is maintained in adjusted position.

3. The combination with lapped members having registering openings therethrough of a bolt having integral head and shank portions, said shank being threaded adjacent its end and being projected through said threaded openings and said head being formed with a diametrically disposed slot in its upper surface and with its under surface tapering uniformly in opposite directions from its median line parallel with the slot to the edges thereof, and a nut screwed on the threaded portion of the shank for engaging with the adjacent one of the lapped members and for clamping the head to the opposite surface of the other of the lapped members, said nut having a diametrically disposed slot in its upper side and having its under surface tapering uniformly in opposite directions from the median line thereof parallel with the last named slot, whereby the head and the nut are clamped in adjusted positions to opposite surfaces of the lapped members and the nut is locked to the shank.

4. The combination with lapped members having registering openings therethrough of a bolt having integral head and shank portions, said shank being threaded adjacent its end and being projected through said threaded openings and said head being formed with a diametrically disposed slot in its upper surface and with its under surface tapering uniformly in opposite directions from its median line parallel with the slot to the edges thereof, a washer disposed on the shank between the head and the adjacent one of the lapped members, said washer being formed with its under surface corrugated to grip the surface of the contiguous member, and a nut screwed on the threaded portion of the shank to engage with the adjacent one of the lapped members, whereby the head is clamped to the upper surface of the washer and the latter is clamped tightly to the contiguous surface of the member adjacent to the head.

5. A device of the character described comprising a threaded shank adapted to engage with a threaded opening and a head integral with the shank, said head having a diametrically disposed slot in its upper surface and being formed with its under surface tapering uniformly from the median line thereof parallel with the slot, so that the under surface of the head is moved into engagement at opposite edges thereof with the surface provided with the threaded opening in which the shank is screwed and the head is thus maintained in adjusted position relative to the work.

JULIUS MATTSON.